Jan. 9, 1934.　　J. E. POINTON ET AL　　1,942,974
BAKING OVEN
Filed May 19, 1933　　3 Sheets-Sheet 1

Jan. 9, 1934.   J. E. POINTON ET AL   1,942,974
BAKING OVEN
Filed May 19, 1933   3 Sheets-Sheet 3

Patented Jan. 9, 1934

1,942,974

UNITED STATES PATENT OFFICE

1,942,974

BAKING OVEN

John Edward Pointon and Warwick Henry Beanes, Westwood Works, Peterborough, England, assignors to Baker Perkins Company, Inc., Saginaw, Mich., a corporation of New York Application May 19, 1933. Serial No. 671,844, and in Great Britain April 14, 1932

3 Claims. (Cl. 107—57)

This invention relates to bread baking ovens wherein the bread is baked in a steam charged atmosphere and is more especially applicable to ovens of the endless conveyor type usually provided with swinging trays or pans for the reception of the dough.

In applying the invention to ovens of the above conveyor type, it is preferred that both the feeding in of the dough and the delivery of the baked bread take place at the same end of the oven.

In ovens in which a steam atmosphere is employed it has been found that difficulty is experienced in securing efficient baking and the production of a good product, more especially as regards the condition of the crust and outside appearance. It has also been found that this trouble is due, either wholly or in part, to the escape of steam and passage thereof over the dough as it travels into the oven.

The object of the present invention is to provide an improved oven arrangement wherein the above difficulties are avoided to enable a steam atmosphere more efficiently or effectively to be employed in conjunction with ovens of the endless conveyor type, particularly where the oven conveyor travels in a tortuous or lap upon lap path.

The invention consists in controlling the flow of steam in a baker's oven of the type described, so that the flow takes place in the direction of movement of the conveyor, and in feeding the dough into the oven so that it enters the steam atmosphere from below the ceiling level of the steam, the arrangement being such that outflow for the steam takes place on the return track of the conveyor and hence any current of escaping steam is over the baked bread only.

The invention also consists in a baker's oven of the type described, having a charging and discharging station at the same end of the oven, an outlet preferably controlled by adjustable means and preferably at or near the station, for determining the height of steam escape, a baffle separating the feeding and return laps of the conveyor adjacent the station and extending below said outlet, and baffles within the oven for directing the flow of steam, the arrangement being such that the flow of steam follows the conveyor movement from the entrance of the dough to discharge.

The height of steam escape may be controlled by a vertically adjustable door or baffle, or a vertical series of controllable openings.

In the accompanying drawings which illustrate one form of bread baking oven having the invention applied thereto:

Figure 1:
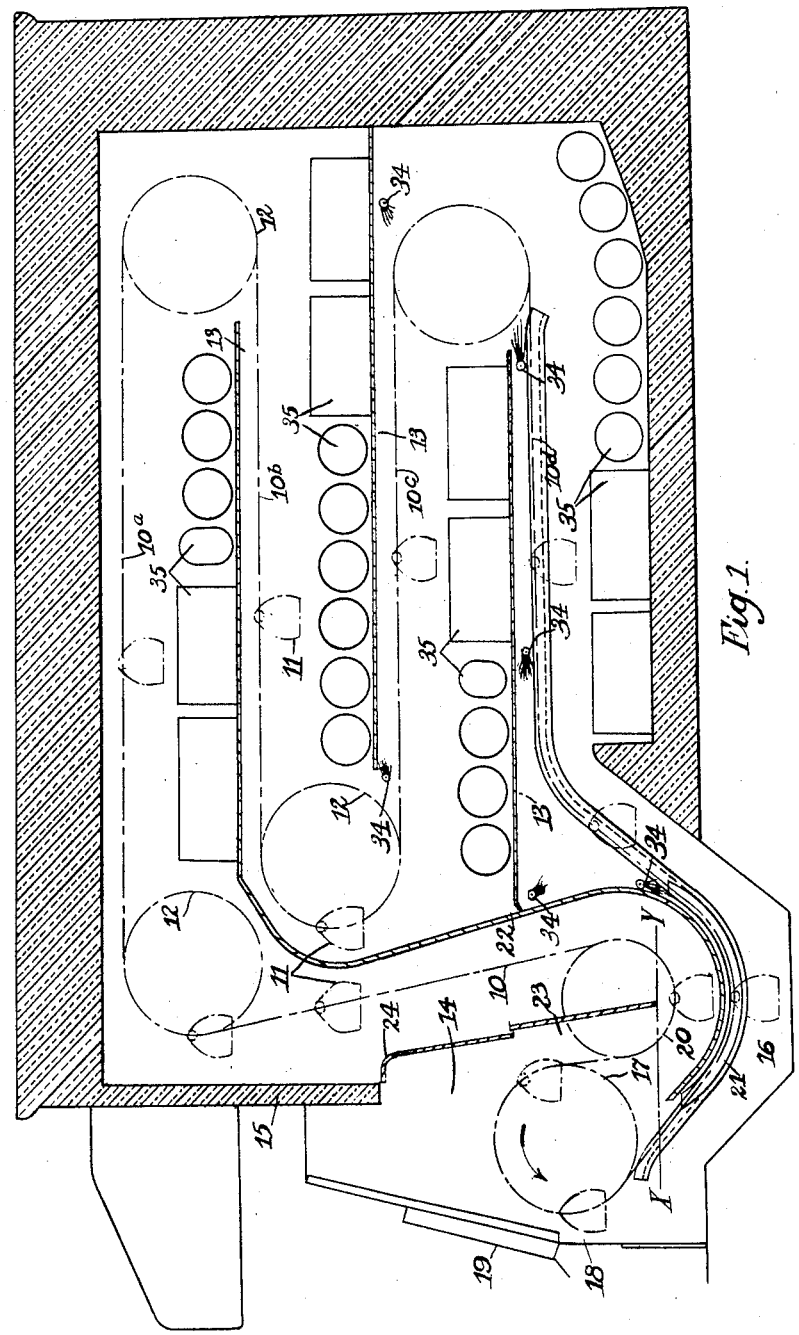
Figure 1 is a longitudinal sectional elevation.
Figure 2:
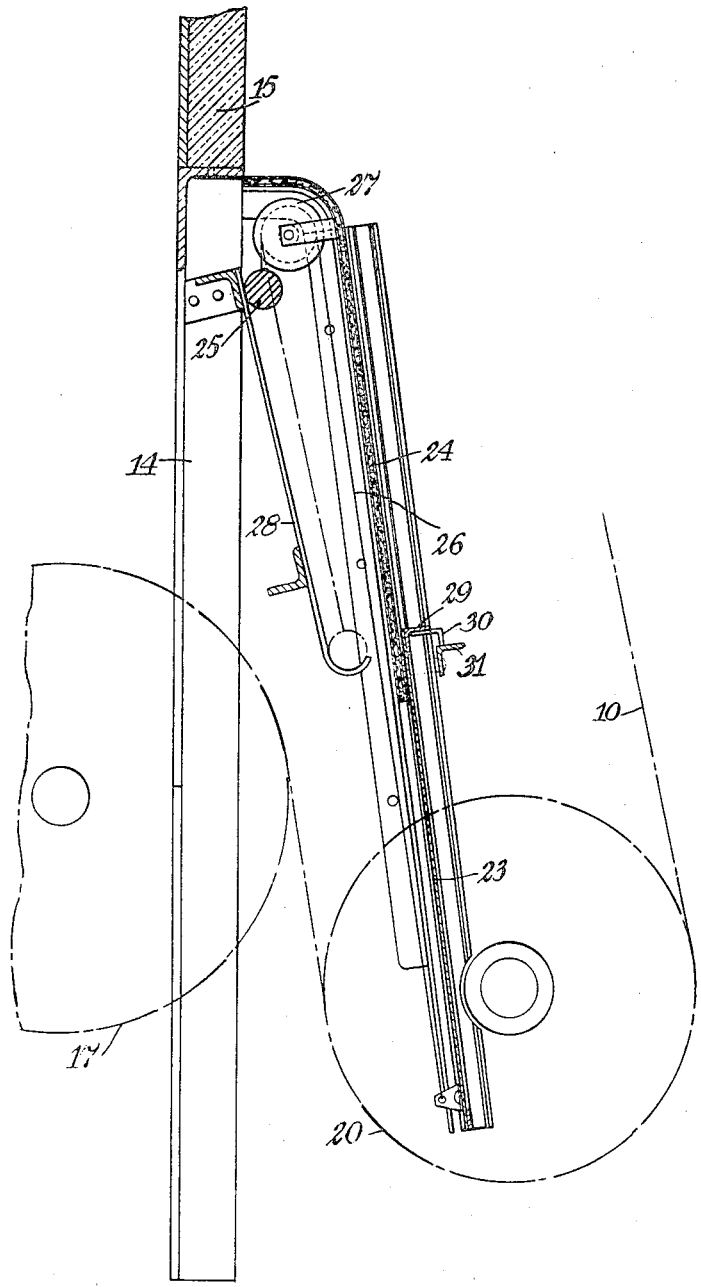
Figure 2 is a cross section to a larger scale of the door controlling the steam level.
Figure 3:
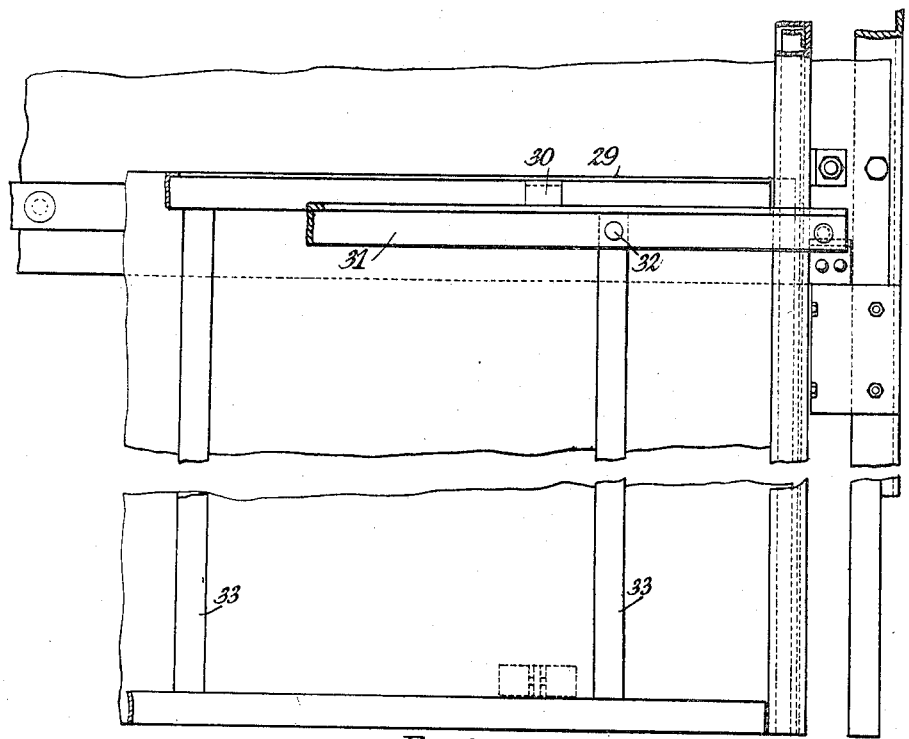
Figure 3 is a partial front view of the door shown in Figure 2.
Figure 4:
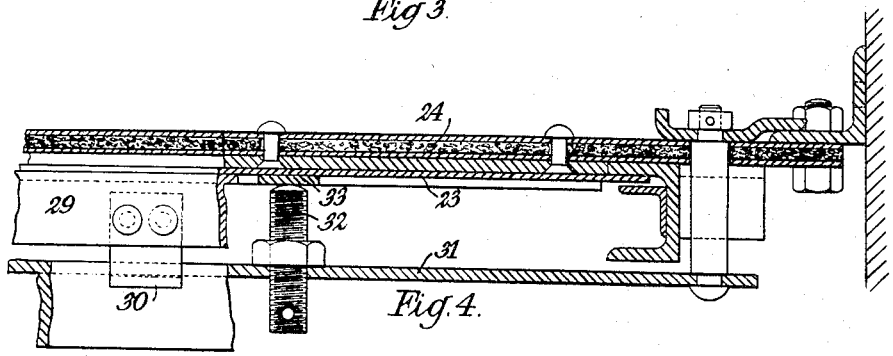
Figure 4 is a partial sectional plan of the door.

In carrying the invention into effect according to one convenient mode (see Figures 1 to 4) an endless conveyor 10 having the usual swinging pans or trays 11 is disposed within an oven, by the provision of the usual guide chain wheels 12 in a series of superposed laps $10a$, $10b$, $10c$, $10d$ divided by partitions or baffles 13 in the customary manner. The oven is closed upon all sides except at the front of the oven where the feed and delivery are to take place. At this point a slot or opening 14 is provided in the lowest part of the wall 15. In conjunction with the opening 14 or not, as the case may be, a depression 16 may be formed in the floor to afford additional clearance and facilitate maintaining the steam at the desired level.

A pair of chain wheels 17 is mounted outside the oven proper adjacent the slot or opening 14 above mentioned and adapted to act as a terminal turning point of the endless conveyor 10 and as a feed and delivery station for the dough and baked bread respectively. The conveyor at this position may, if desired, be protected by a supplementary housing 18 having a door 19.

Underneath or adjacent the opening 14 another pair of chain wheels 20 is mounted for guiding the return course of the conveyor through the slot. These chain wheels 20 may, if desired, be located in the cavity 16.

The conveyor 10 on entering the oven passes below the chain wheels 17 and 20 and is guided by rails 21 downwardly into the cavity 16 and thence upward onto the lower straight lap $10d$. The paths of the returning pans of the conveyor and of the pans which have just been fed with dough and are entering the oven are separated by a baffle plate 22 which is curved at its lower end to conform to the guide rails 21 and is jointed to or connected up with the baffle plates 13 between certain of the laps of the conveyor within the oven.

The end slot or opening 14 in the oven has mounted adjacent to it a vertical, slidable damper, or register plate 23, which may be raised or lowered at will so as to determine the level of the steam atmosphere within the oven, as indicated by the line XY, Figure 1.

The steam door 23 is associated with a fixed baffle 24 which extends to the top of the opening 14 and is connected to a counterweight bar 25 by chains 26 passing over guide pulley 27. The counterweight 25 is controlled by guide members 28 which are curved at their lower ends to support the bar when the steam door is adjusted to its highest position.

The upper edge of the door is provided with a strengthening angle iron 29 which carries stop pieces 30 adapted to rest upon a fixed transverse angle bar 31 when the door is in its lowest position.

In order to make a steam tight joint between the steam door and the fixed baffle 24 screwed studs 32 are mounted upon the bar 31 and bear against vertical strips 33 fixed upon the door.

The steam may be introduced into the oven in any of the known manners by injection at various points 34 or otherwise. The damper or door 23 is also arranged to restrict the opening 14 of the oven so that a passage to atmosphere is provided along the line taken by the conveyor pans as they pass around the wheels 20 and out of the oven. By the arrangement of the baffle plate 22 before mentioned, between the pans leaving and those entering the oven, it will be appreciated that the paths of these pans are kept separate.

As the steam atmosphere will escape from the oven at the highest available point, it takes the course of passing out with the pans on their way to the delivery point under the damper or register plate 23. The exit of the steam in this position causes a flow to take place in the direction of travel of the dough pans while the entering dough will be progressively introduced into the steam atmosphere with a certain amount of entering air so that the action of the steam will be gradual. The adjustable damper 23 is so arranged in relation to the baffle plate 22 between the pans leaving and those entering the oven that a very fine balance is maintained, allowing only the steam to escape with the pans leaving the oven, and no undue flow of air, thus keeping the atmosphere within the baking chamber as still as possible. Moreover, it will be observed that the steam will act upon the entering dough as it passes in the same direction of travel as the dough and not as a counter blast or current to the freshly arriving dough pieces, thus avoiding any premature drying of the dough and the ill effects which arise from this cause.

Instead of a single plate or door 23 mounted so as to be adjustable as to height, a vertical series of narrow doors or slots may be provided so that the level of the steam may be controlled by opening or adjusting the appropriate slot or door.

The oven is heated by composite heating elements 35 arranged and constructed according to United States Patent No. 1,858,937 to John E. Pointon.

Having thus described our invention, what we claim and desire to secure by Letters Patent is:

1. A baker's oven of the endless conveyor type, wherein the bread is baked within a steam charged atmosphere, having a feed and delivery station at the same end of the oven, an outlet for steam, a register plate adjacent the station arranged to determine the height of steam escape, a baffle plate separating the feeding and return laps of the conveyor adjacent the station, said baffle plate extending forwardly below said register plate, said conveyor also extending forward thereof to present a feed and delivery station and baffles within the oven extending rearwardly of said first mentioned baffle plate and joined thereto, said rearward baffles being arranged for directing the flow of steam conformably with the direction of conveyor movement from the entrance of the dough into the steam charged atmosphere to its discharge therefrom.

2. A baker's oven of the endless conveyor type wherein the bread is baked within a steam charged atmosphere, having a feed and delivery station at the same end of the oven, an outlet for steam, adjustable control means for said outlet located adjacent the station and operable to determine various heights of steam escape, a baffle plate separating the feeding and the return laps of the conveyor adjacent the station and extending below said control means, and baffles within the oven arranged for directing the flow of steam conformably with the direction of conveyor movement from the entrance of the dough to discharge, terminal guide wheels for said conveyor located forwardly of the adjustable control means to present the said feed and delivery station, the said baffle plate which separates the feeding and return laps being arranged to extend below the said station, the feeding lap being guided downwardly from said terminal wheels and rearwardly below the said baffle plate and thence upwardly into the steam charged portion of the oven.

3. In a bake oven having an opening in a wall thereof, and a traveling conveyor therein, a register plate vertically adjustable within the oven adjacent the said opening, a fixed baffle associated with the register plate and extending to the oven wall at the top of the opening, an upright baffle plate located rearwardly of said register plate, the lower end of said baffle plate being shaped to extend underneath the lower edge of the register plate and forwardly thereof, conveyor chain wheels mounted adjacent the opening and in front of the register plate and adapted to present a feed and delivery station for said conveyor, and means for guiding the conveyor beneath the said lower end of the upright baffle plate from said station downwardly into the oven, rearwardly and thence upwardly, and means for guiding the delivery course of the conveyor to said station above said lower portion of the baffle plate and beneath the lower edge of the register plate.

JOHN EDWARD POINTON.
WARWICK HENRY BEANES.